E. J. ARMSTRONG.
STEAM ENGINE.
APPLICATION FILED APR. 19, 1909.

946,094.

Patented Jan. 11, 1910.
2 SHEETS—SHEET 1.

Witnesses
K. R. Kane
J. J. Schwartz

Inventor
Edwin J. Armstrong
by H. L. Lind
Attorney

E. J. ARMSTRONG.
STEAM ENGINE.
APPLICATION FILED APR. 19, 1909.

946,094.

Patented Jan. 11, 1910.
2 SHEETS—SHEET 2.

Witnesses

Inventor
Edwin J. Armstrong
by H. C. Lord
Attorney

UNITED STATES PATENT OFFICE.

EDWIN J. ARMSTRONG, OF ERIE, PENNSYLVANIA, ASSIGNOR TO BALL ENGINE COMPANY, OF ERIE, PENNSYLVANIA, A CORPORATION OF PENNSYLVANIA.

STEAM-ENGINE.

946,094.     Specification of Letters Patent.     Patented Jan. 11, 1910.

Application filed April 19, 1909. Serial No. 490,670.

*To all whom it may concern:*

Be it known that I, EDWIN J. ARMSTRONG, a citizen of the United States, residing at Erie, in the county of Erie and State of Pennsylvania, have invented certain new and useful Improvements in Steam-Engines, of which the following is a specification.

This invention relates to steam engines, and consists in certain improvements in the construction thereof as will be hereinafter fully described and pointed out in the claims.

More particularly the invention relates to adjusting devices for pressure plates used with balanced valves.

Figure 1:
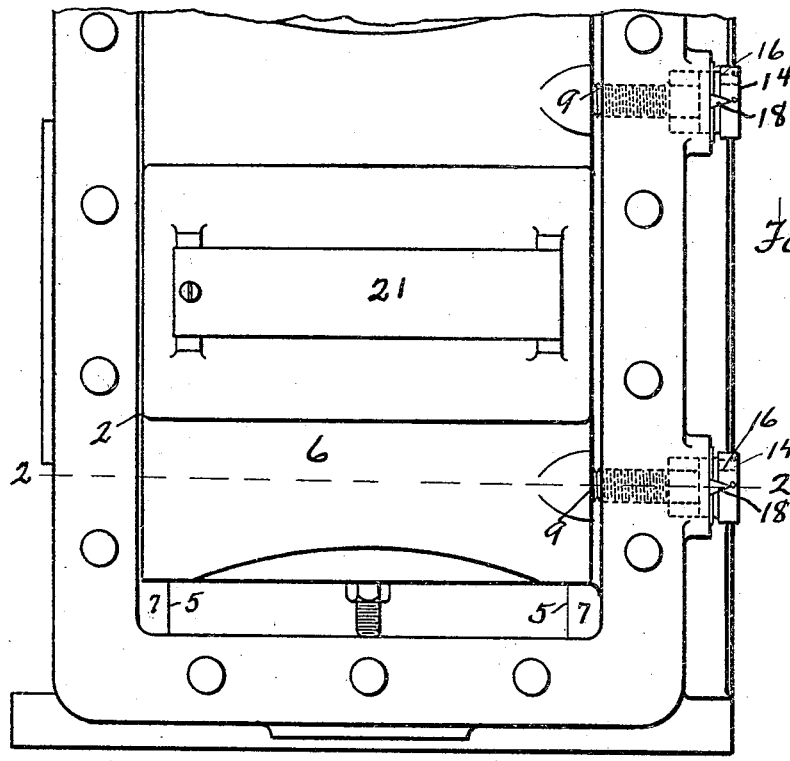
Figure 2:
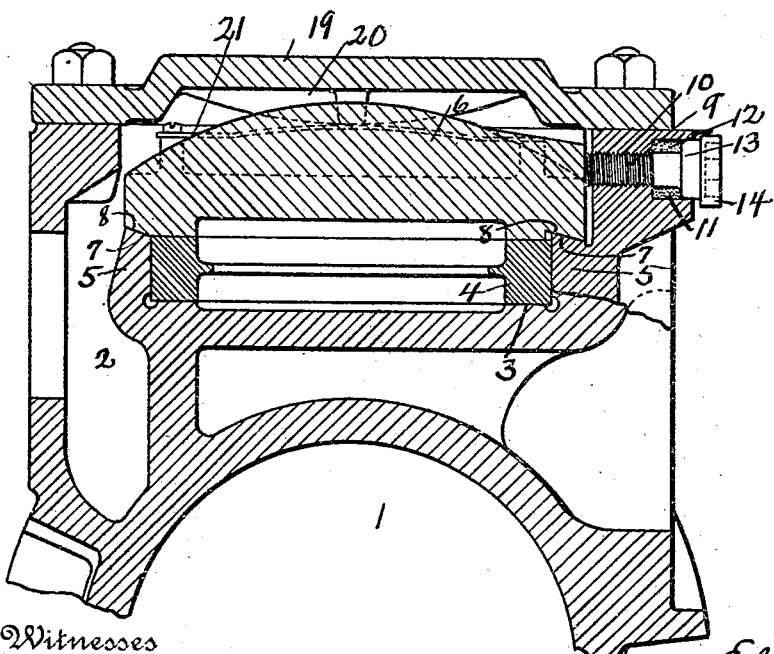
Figure 3:
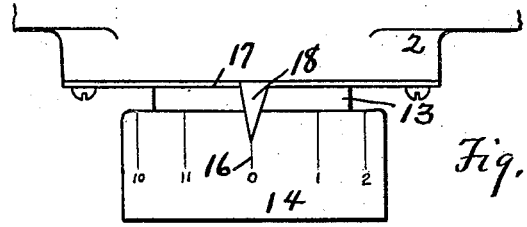
Figure 4:
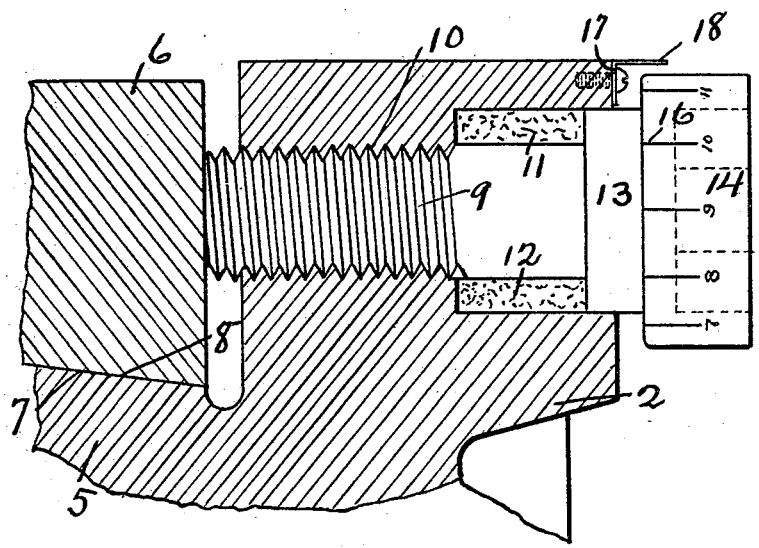
Figure 5:
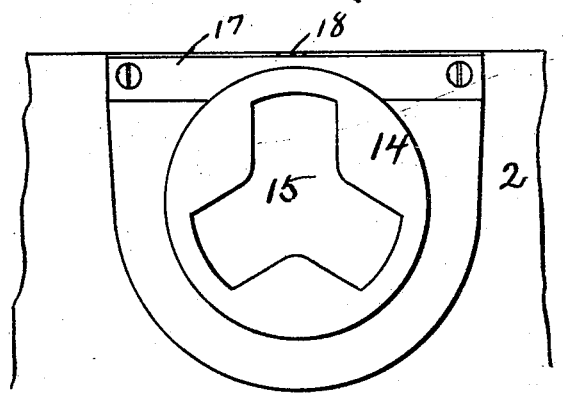

The invention is illustrated in the accompanying drawings as follows:

Figure 1 shows a side view of a steam chest and valve, the steam chest cover being removed to better show construction. Fig. 2 is a section on the line 2—2 in Fig. 1. Fig. 3 is a side view of the graduated head of an adjusting screw with its pointer. Fig. 4 is an enlarged section of the adjusting screw on the line 2—2 in Fig. 1. Fig. 5 is an end view of the adjusting screw showing a key socket in the head.

1 marks the engine cylinder; 2 the steam chest; 3 the valve seat, and 4 the valve operating upon the seat. These parts are of the usual construction. The valve operates between the ledges 5, 5, and the pressure plate 6 rests on these ledges. The supporting surfaces 7, 7 on the ledges 5 are at an angle to the plane of the valve, the angle being less than 45°. The supporting surfaces 8 on the pressure plate resting on the surfaces 7 on the ledges have a similar angle to the plane of the valve. The steam chest cover 19 has the usual pressure lug 20 on its inner side which engages the spring 21 secured to the pressure plate, so that the pressure plate is pressed to its seat by the spring at all times.

Where it is desired to adjust the pressure plate relatively to the valve, this can be done by moving the pressure plate laterally, so that there is relative movement between the supporting surfaces 7 and 8. Where these supporting surfaces are at an angle less than 45°, it is apparent that the movement of the pressure plate toward and from the valve is less than the lateral movement. In this way a very nice adjustment can be made.

I provide two screws 9 for effecting the lateral movement of the pressure plate. These screws extend through the screw threaded openings 10 in the walls of the steam chest. The outer end of the screw passes through a gland 11 in the steam chest wall, and an elastic packing is arranged in this gland. A packing shoulder 13 on the screw crowds this packing into the gland.

The head 14 of the screw is preferably cylindrical, and is provided in its face with a key socket 15, so that by means of a special tool the screw may be adjusted. The outer surface of the head has the graduating marks 16. A plate 17 secured to the steam chest wall carries a pointer 18 over these graduated marks.

To get the right adjustment, the plate is initially adjusted by means of the two screws. This point of adjustment is similarly marked on both screws preferably with zero, and the screws starting from this point are similarly graduated. The pressure plate therefore may be adjusted to exactly the same extent at each end by adjusting the two screws to the same extent, the similar graduations indicating the extent of the adjustment.

The elastic packing permits the screws to be packed out for this adjustment without causing leakage through the opening in the chest. The adjustment of the screws is accomplished without at the same time providing means whereby these screws may be carelessly adjusted, the idea being to prevent the operating of these screws except by some one having a full knowledge of the mechanism.

What I claim as new is:

1. In a steam engine, the combination of a steam chest; a valve in the steam chest; a pressure plate over the valve; ledges supporting the pressure plate, their supporting surfaces being at an angle to the plane of the valve; means for adjusting the pressure plate laterally on the surfaces for adjusting the plate relatively to the valve comprising a screw having a head with a key socket therein, said head being graduated; and a pointer adjacent to the graduations on the head.

2. In a steam engine, the combination of a steam chest; a valve in the steam chest; a pressure plate over the valve; ledges supporting the pressure plate, their supporting surfaces being at an angle to the plane of the valve; means for adjusting the pressure plate laterally on the surfaces for adjusting the plate relatively to the valve, comprising a screw extending through the wall of the steam chest; a gland in the wall surrounding the screw; a packing shoulder on the screw and entering the gland; and an elastic packing in the gland.

3. In a steam engine the combination of a steam chest; a valve in the steam chest; a pressure plate over the valve; ledges supporting the pressure plate, their supporting surfaces being at an angle to the plane of the valve; means for adjusting the pressure plate laterally on the surfaces for adjusting the plate relatively to the valve, comprising two screws; and indicating devices for said screws arranged to indicate equal adjustments of said screws.

In testimony whereof I have hereunto set my hand in the presence of two subscribing witnesses.

EDWIN J. ARMSTRONG.

Witnesses:
K. R. KANE,
ANTON OTTEN.